United States Patent
Kohlmann

(10) Patent No.: US 11,176,708 B2
(45) Date of Patent: Nov. 16, 2021

(54) CAMERA AND METHOD FOR CHECKING AN ALIGNMENT OF SUCH A CAMERA

(71) Applicant: IFM ELECTRONIC GMBH, Essen (DE)

(72) Inventor: Klaus Kohlmann, Ravensburg (DE)

(73) Assignee: IFM ELECTRONIC GMBH, Essen (DE)

( * ) Notice: Subject to any disclaimer, the term of this patent is extended or adjusted under 35 U.S.C. 154(b) by 0 days.

(21) Appl. No.: 16/951,572

(22) Filed: Nov. 18, 2020

(65) Prior Publication Data
US 2021/0158569 A1    May 27, 2021

(30) Foreign Application Priority Data
Nov. 21, 2019 (DE) .......................... 102019131482.8

(51) Int. Cl.
| | |
|---|---|
| *G06T 7/00* | (2017.01) |
| *G06T 7/80* | (2017.01) |
| *H04N 13/246* | (2018.01) |
| *H04N 17/00* | (2006.01) |
| *H04N 5/232* | (2006.01) |
| *H04N 7/18* | (2006.01) |

(52) U.S. Cl.
CPC .................. *G06T 7/85* (2017.01); *G06T 7/97* (2017.01); *H04N 13/246* (2018.05); *G06T 2207/10024* (2013.01); *G06T 2207/20224* (2013.01)

(58) Field of Classification Search
None
See application file for complete search history.

(56) References Cited

U.S. PATENT DOCUMENTS

| | | | | |
|---|---|---|---|---|
| 8,122,878 | B1* | 2/2012 | Gross | F24S 23/77 |
| | | | | 126/600 |
| 9,079,417 | B1* | 7/2015 | Yasukawa | H04N 1/4055 |
| 10,187,147 | B2* | 1/2019 | Aoyama | H04B 10/1141 |
| 10,606,079 | B1* | 3/2020 | Keith | G02B 26/0833 |
| 2006/0280360 | A1* | 12/2006 | Holub | H04N 17/045 |
| | | | | 382/162 |

(Continued)

FOREIGN PATENT DOCUMENTS

| | | |
|---|---|---|
| DE | 69921237 T2 | 2/2006 |
| KR | 20180048048 A * | 5/2018 |

(Continued)

OTHER PUBLICATIONS

Reiner et al., "Dual-Color Mixing for Fused Deposition Modeling Printers," Eurographics 2014, vol. 33 (2014), No. 2, DOI: 10.1111/cgf.12319 (Year: 2014).*

(Continued)

*Primary Examiner* — Soo Shin
(74) *Attorney, Agent, or Firm* — Harness, Dickey & Pierce, P.L.C.

(57) ABSTRACT

A method for checking an alignment of a 2D or 3D camera, wherein a reference image is detected and stored in a first preferred alignment of the camera, wherein a current image is detected to check the alignment of the camera, wherein the reference image is provided monochrome with a first color and the current image is provided monochrome with a second color that differs from the first color, and wherein the current image and the reference image are displayed as an image mixing.

4 Claims, 3 Drawing Sheets

(56) References Cited

U.S. PATENT DOCUMENTS

| | | | | |
|---|---|---|---|---|
| 2016/0042621 A1* | 2/2016 | Hogg | ............... | G08B 13/19615 |
| | | | | 348/155 |
| 2017/0064208 A1* | 3/2017 | Salimpour | ....... | H04N 5/232935 |
| 2020/0169706 A1* | 5/2020 | Mori | .................... | H04N 9/3185 |
| 2021/0005015 A1* | 1/2021 | Ghosh | ....................... | G06T 9/00 |
| 2021/0011154 A1* | 1/2021 | Smits | .................. | H04N 13/383 |

FOREIGN PATENT DOCUMENTS

| | | | | |
|---|---|---|---|---|
| WO | WO-2013111134 A1 * | 8/2013 | ........... | H05B 47/125 |
| WO | WO-2015155070 A1 * | 10/2015 | ......... | G01B 11/2509 |
| WO | WO-2017145207 A1 * | 8/2017 | ......... | H04B 10/1141 |

OTHER PUBLICATIONS

Bimber et al., "The Visual Computing of Projector-Camera Systems," Eurographics 2007, STAR—State of The Art Report (Year: 2007).*
Translation of KR-20180048048-A (Year: 2018).*

\* cited by examiner

CAMERA AND METHOD FOR CHECKING AN ALIGNMENT OF SUCH A CAMERA

CROSS-REFERENCE TO RELATED APPLICATIONS

The present application claims the benefit and priority of German Patent Application No. DE1020191314828, filed Nov. 21, 2019. The entire disclosure of the application referenced above is incorporated herein by reference.

FIELD

The invention relates to a camera and a method as specified in the independent claims.

BACKGROUND

The camera in question is primarily a 2D or 3D camera for monitoring an industrial environment.

A method for determining a camera misalignment is already known from DE 10 2018 108 054 A1, in which camera images are evaluated with regard to color and/or brightness by means of a processor, wherein a misalignment of the camera images is recognized if the brightness and/or color between the images deviates.

SUMMARY

The object of the invention is to simplify the alignment or checking the misalignment of a camera.

The object is advantageously achieved by the camera according to the invention and the method according to the invention.

A method for checking the alignment of a 2D or 3D camera is advantageously provided, wherein a reference image is detected and stored in a first preferred alignment of the camera, wherein a current image is detected to check the alignment of the camera, wherein the reference image is provided monochrome with a first color and the current image is provided monochrome with a second color that differs from the first color, and the current image and the reference image are displayed as an image mixing.

This procedure has the advantage that no position markers are necessary to check the positioning of the camera or to restore the positioning when the device is replaced.

The invention is explained below in more detail based on exemplary embodiments with reference to the drawings.

DETAILED DESCRIPTION

In the following description of the preferred embodiments the same reference symbols designate the same or comparable components.

Figure 1:
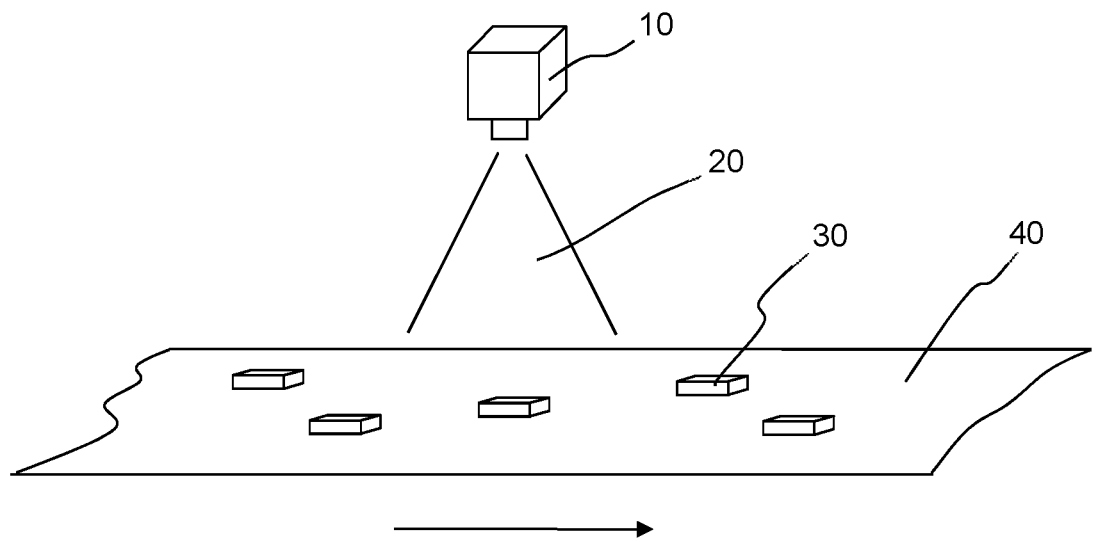
FIG. 1 a detection of a typical industrial environment by use of a camera.

FIG. 1 shows a conveyor belt 40 with a plurality of objects 30 which are carried on the conveyor belt 40. A 2D and/or 3D camera 10, which monitors the conveyor belt 40, is arranged above the conveyor belt.

Figure 2:
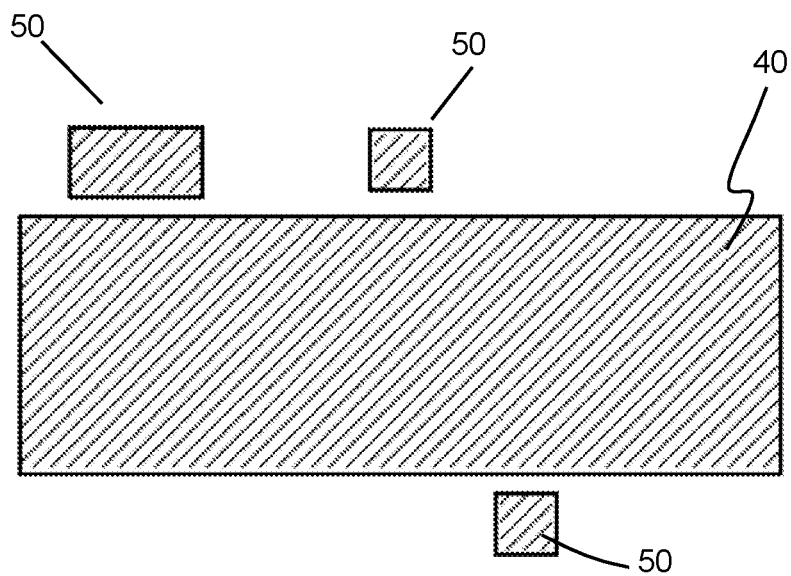
FIG. 2 a detection area of the camera specified in color as a reference.

FIG. 2 shows a plan view of the area of the conveyor belt 40 monitored by the camera 10, in which further conveyor belt installations 50 are detected, too. According to the invention, the detection area is captured as a reference image and preferably stored as a reference in the camera or in application software. The image is preferably stored monochrome with a first color. This is indicated by the hatching ascending to the right.

Figure 3:
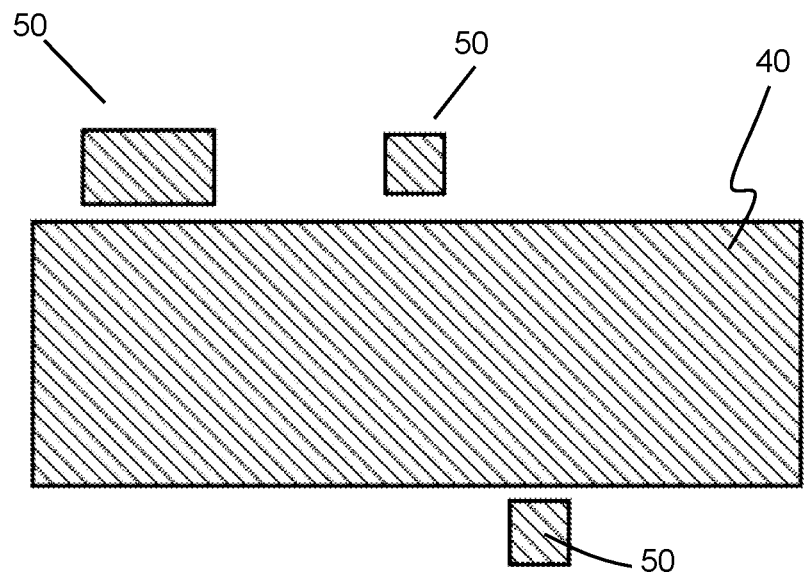
FIG. 3 a current detection area of the camera specified in a complementary color.

FIG. 3 shows a plan view of the area of the conveyor belt monitored by the camera 10 at a later point in time. In order to check the alignment of the camera 10, the detected area is captured as a current detection image and also stored in the camera or in application software. The current image is preferably stored monochrome with a second color that differs from the first color. This is indicated by the hatching ascending to the left. In a further preferred embodiment, the first and the second colors are complementary to one another.

In principle, moreover, a part of the detection area can be used as the reference image and as the current image. Moreover, it is not necessary to additionally detect objects outside the conveyor belt or the area to be monitored as long as there are sufficient orientation points within the detection area for an alignment of a camera.

Furthermore, the reference image and/or the current image do not necessarily have to be stored in monochrome, it is basically sufficient if the images are available in monochrome color for evaluation.

The camera 10 typically provides a live image of the currently detected area as a gray-scale value image or an amplitude image. In order to be able to check whether the installation position has changed or still corresponds to the position that was desired at the initial operation, the reference image stored in the camera (2D gray-scale value image or 3D amplitude image) can be used as the target installation position.

The reference image does not have to include any position markers or the like, but is an image of the current installation position. In order to recognize any changes in the installation position, the reference image and the live image are, for example, superimposed in color and partially transparent. For example, by setting the transparency of the image to e.g. 50% and evenly filling the image with one color.

The reference image can for example be arranged in the background and the live image in the foreground (or vice versa). If different colors are used for the coloring of the two images (live image/current image and reference image), the colors are mixed in accordance with color theory and thus the user is assisted in checking the position.

When a device is replaced, this procedure assists the user in setting up the identical installation position again. If the position matches, the images are superimposed accordingly.

Figure 4:
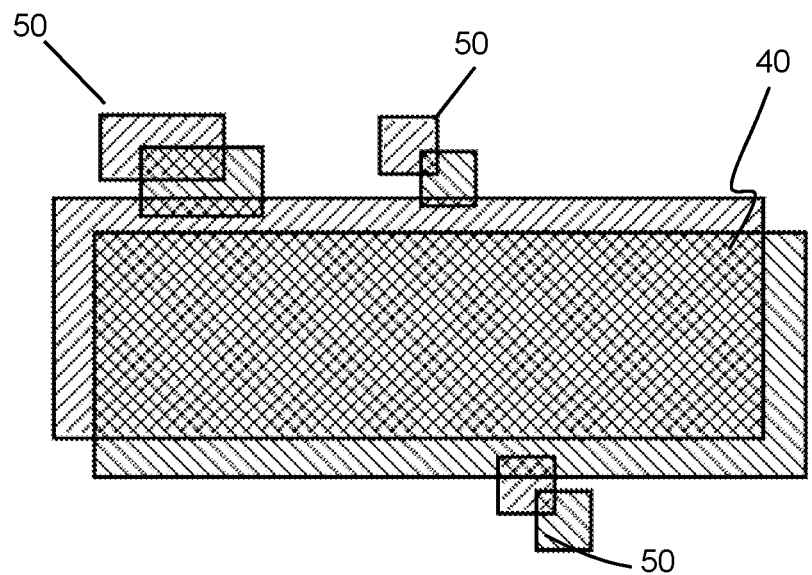
FIG. 4 a detection area of the camera shifted with respect to the reference.

FIG. 4 shows a situation in which the current image and thus the alignment of the camera 10 is shifted with respect to the original alignment and the reference position. For example, through additive mixing of the current image and the reference image and, for example, a complementary coloring of the two images, the corresponding areas mix to form a white/gray area or cancel each other. The areas that do not match remain visible as colored areas.

The image mixing can be displayed, for example, on a display of the camera itself or on an external monitor. It is also conceivable to transmit the image data to a handheld device, in particular a cell phone or a tablet, and to display them thereon.

Figure 5:
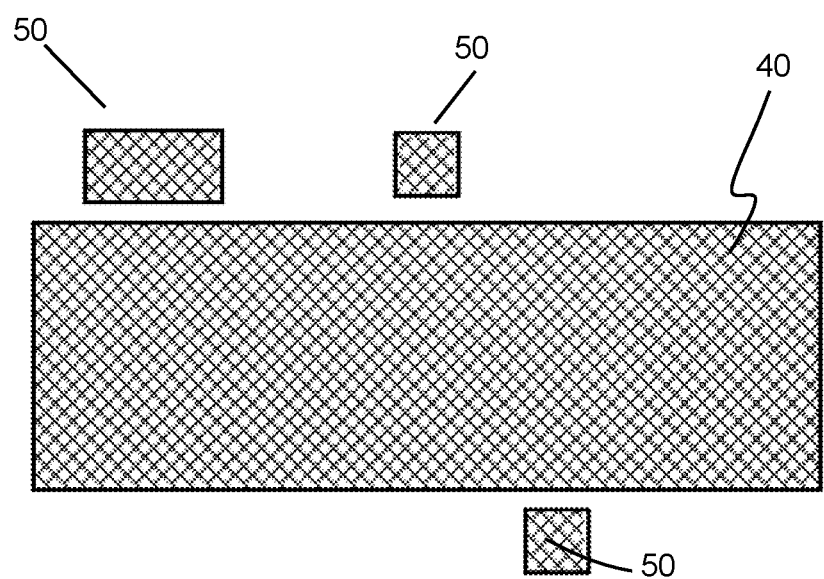
FIG. 5 a detection area congruent with the reference.

FIG. 5 shows a complete matching of the current image and the reference image. In the additive image mixing, the entire image would typically be cancelled or mixed to form a gray-scale value.

The use of complementary colors is helpful, but the method basically also works with other color combinations and/or with other image mixing methods. Thus, for example, a multiplicative, subtractive or some other image mixing would also be conceivable. It is essential that the colors and the image mixing are selected in such a way that the matching image areas differ significantly from the shifted areas.

What is claimed is:

1. A method for recognizing changes in an installation position of a 2D or 3D camera and for checking an alignment of the 2D or 3D camera, comprising, detecting and storing a reference image in a first alignment of the 2D or 3D camera at a target installation position of the 2D or 3D camera, detecting a current image to check a current alignment of the 2D or 3D camera at a current installation position of the 2D or 3D camera, wherein the reference image is provided monochrome with a first color and the current image is provided monochrome with a second color that differs from the first color, and wherein the current image and the reference image are displayed as an image mixing to compare and recognize changes between the current alignment and the first alignment and the current installation position and the target installation position.

2. The method according to claim 1, wherein the image mixing is implemented subtractively, additively or multiplicatively.

3. The method according to claim 1, wherein the first and the second color are complementary to one another.

4. A 2D or 3D camera which is configured to carry out the method according to claim 1.

* * * * *